Patented Jan. 16, 1951

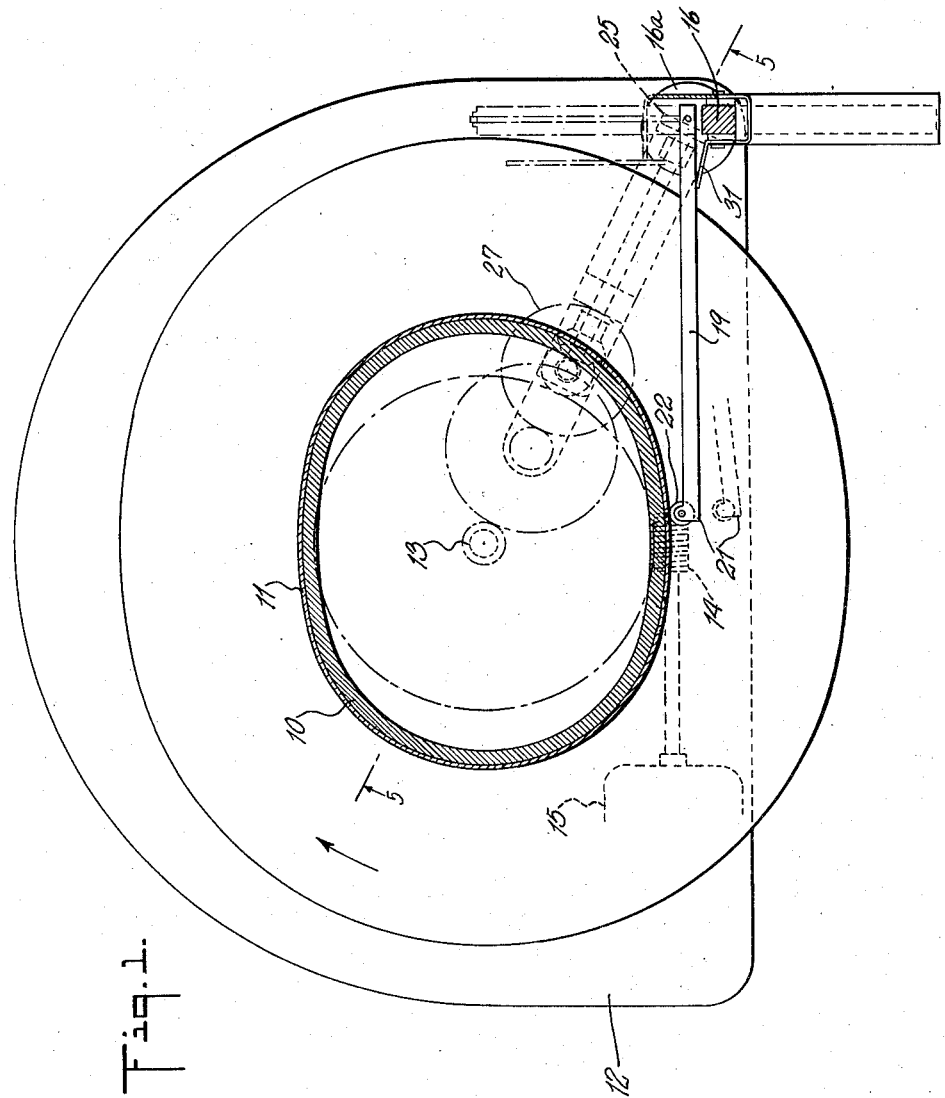

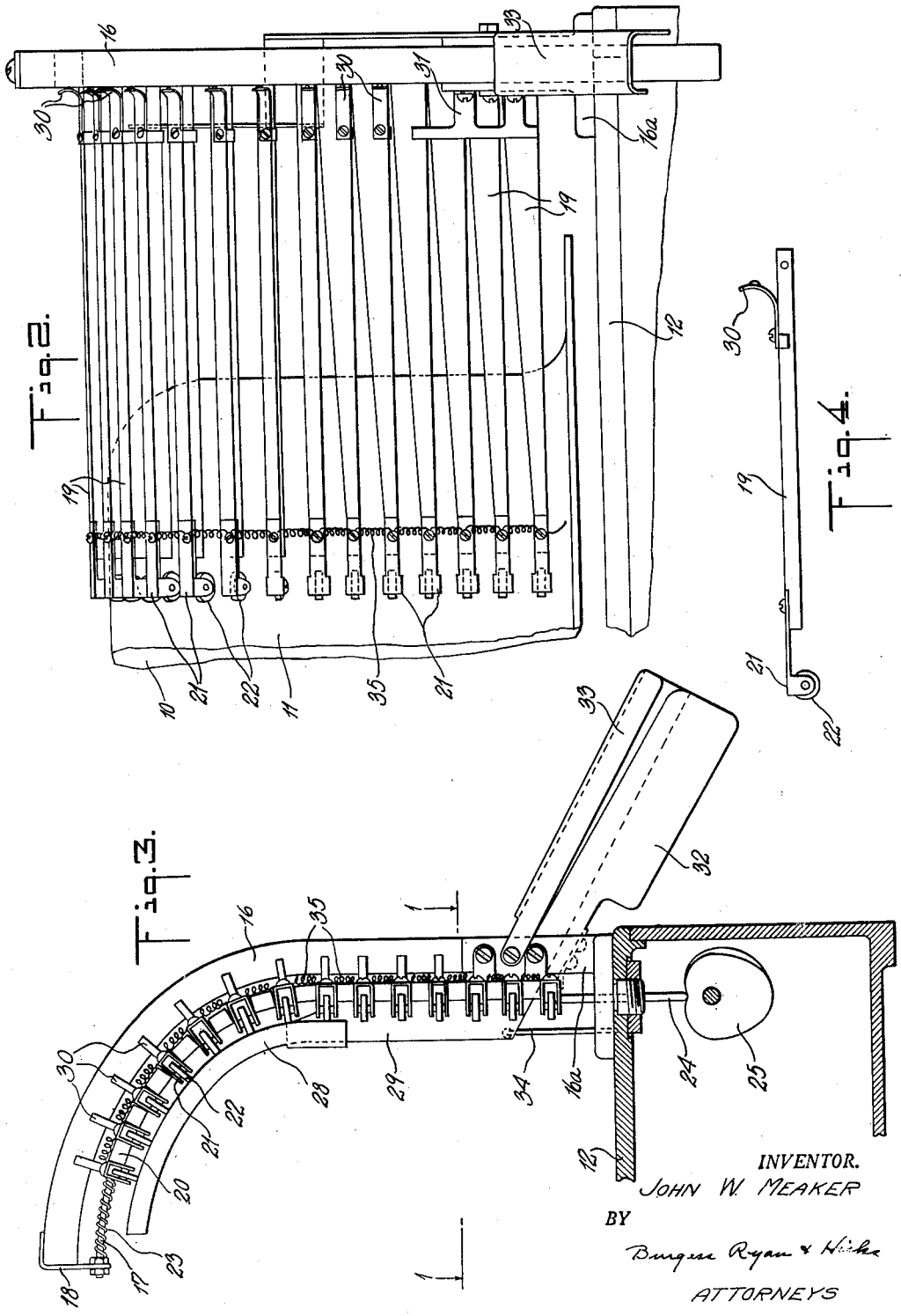

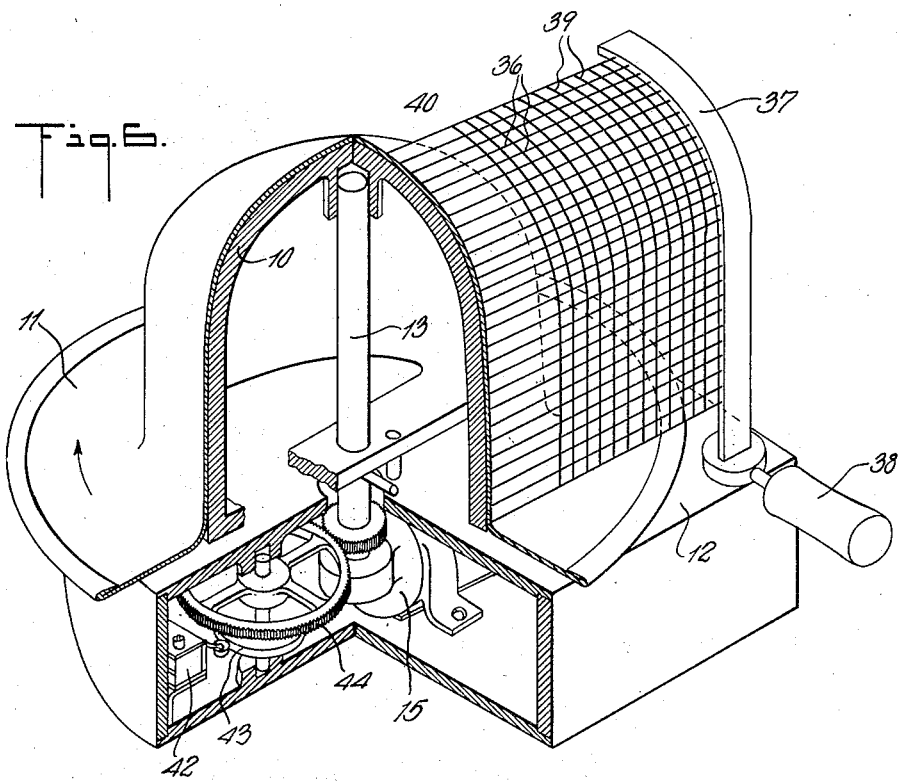
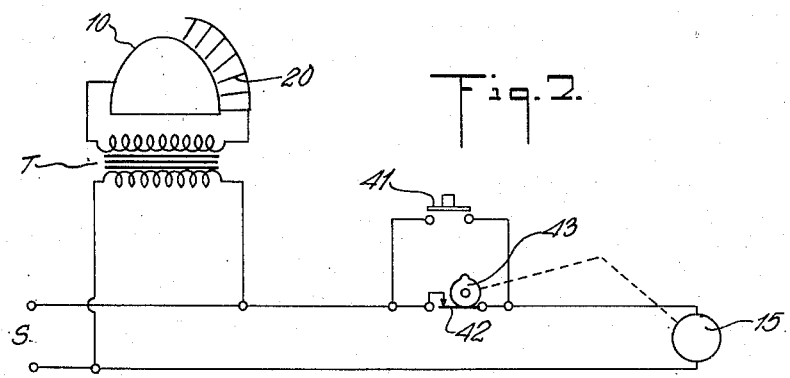
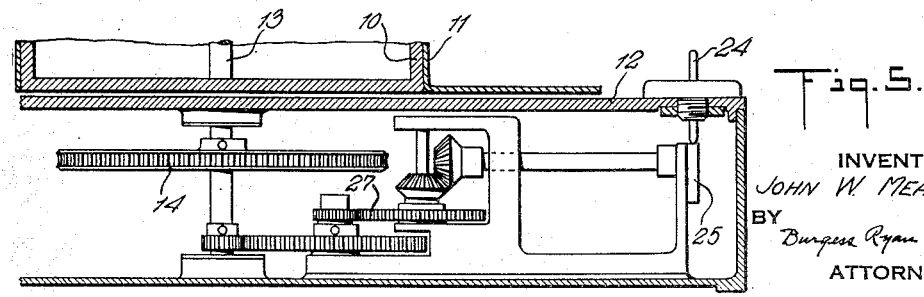

2,538,578

UNITED STATES PATENT OFFICE 2,538,578

APPARATUS FOR ELECTROPERFORATING IRREGULARLY SHAPED ARTICLES

John W. Meaker, New York, N. Y.

Application October 25, 1946, Serial No. 705,784

8 Claims. (Cl. 219—19)

This invention relates to improvements in an electro-perforating machine and more particularly to an apparatus for electro-perforating irregularly shaped objects such as hats, shoes, etc.

The objects and advantages of the invention will be apparent from the following description and the accompanying drawings in which:

Fig. 1 is a plan view in section along the line 1—1 of Fig. 3 of an electro-perforating apparatus embodying the invention;

Fig. 2 is a side view of a portion of the apparatus illustrated in Fig. 1;

Fig. 3 is an end view of a portion of the apparatus illustrated in Fig. 1;

Fig. 4 is a plan view of an electrode;

Fig. 5 is a section view taken along the line 5—5 of Fig. 1;

Fig. 6 is a perspective view in partial section of an electro-perforating apparatus embodying the invention and having a modified electrode;

Fig. 7 is a wiring diagram illustrated schematically for an electro-perforating apparatus embodying the invention.

Throughout the drawings corresponding parts have been designated by like numerals. Referring to the drawings in detail there is an electrode in the form of a hat block 10 which is generally oval shape to receive a hat 11 thereon. The hat block 10 may be made of metal or it may have a surface or portions of the surface capable of conducting an electrical current as the hat block is to serve as an electrode in an electric discharge circuit that will be described in detail hereinafter.

The hat block 10 is rotatably supported on a base 12 by a shaft 13. The shaft 13 may be driven by any suitable means. In the apparatus illustrated, the shaft 13 is driven through a worm and wheel gear arrangement, indicated generally at 14, by a motor 15 (shown in dotted lines in Fig. 1) located inside the base 12.

A main electrode support 16 is mounted in spaced relation to the hat form 10 on a swivel base 16a that is secured to the base 12. This support 16 is curved to conform generally to the outline of the hat block 10. A wire rod 17, shaped to conform with the support 16, is held at one end by a bracket 18 secured to the upper end of support 16 and its other end is secured to the lower part of the support 16.

A series of individual electrode supporting arms 19 held in spaced relation by spacers 20 and extending horizontally from the support 16 are slidably mounted on the rod 17. The individual electrode arms 19 may be made of insulating material with an electrode 21 carried on the free ends thereof. The electrode 21 may be provided with a roller 22 or a smooth surface that will contact the outside of the hat 11 and be spaced from the hat block electrode 10 by the thickness of the material to be perforated.

As shown in Fig. 3, a spring 23, surrounding the rod 17, is located between the bracket 18 and the uppermost individual arm 19. This spring resiliently urges the series of individual arms downwardly along the rod 17 so that the bottom arm is held in engagement with a cam following push rod 24. The opposite end of the push rod 24 engages with a heart-shaped cam 25 which is driven through gearing, indicated generally at 27, operated by rotation of the shaft 13 which also rotates the hat form 10. By means of this arrangement the electrodes may be moved vertically or across the hat 11 as it is being rotated to cover substantially the entire surface of the hat body and crown.

The electrode arms 19 are pivoted on the rod 17 and may move about the rod as an axis. The upper electrode arms which extend outwardly from the rod where it curves into a horizontal position are prevented from falling to a vertical position by a curved support 28 positioned beneath these arms at their inner ends. The curved support 28 is carried by a plate 29 pivotally mounted on the main support 16.

The upper electrode arms 19 each have a curved spring 30, as shown in Fig. 4, located at their inner ends. The springs 30 bear against the main support 16 and resiliently urge the electrodes carried by the arms into contact with the hat 11 on the block 10 when they are in operating position. The lower electrodes are similarly urged into resilient engagement with the hat by a flat spring 31 secured to the main support 16 and which bears against the arms 19. Thus, the electrode carrying arms are resiliently hinged thereby permitting movement of the arms while maintaining the electrodes carried by said arms in engagement with the article being treated despite changes in its contour. Such an arrangement may be readily adapted to engage a set of electrodes with any irregularly shaped articles such as a shoe or the like.

The main support 16 has an angularly extending handle 32 by means of which it may be rotated on the swivel base 16a so as to move the electrodes into and out of engagement with the hat 11 on the hat block 10. This handle 32 has associated with it a grip operated member 33 which is part of the pivoted plate 29 on which the curved support 28 is mounted. When the handle 32 is grasped, the grip member 33 is depressed prior to turning the main support 16. This moves the pivoted plate 29 about its pivot and brings the curved support 28 into engagement with the electrode arms above it to raise them out of engagement with the hat. This permits the electrodes to be brought into or out of operating position without interference with the hat 11 on the hat block 10.

The pivoted plate 29 also carries a downwardly extending rod 34 which acts as a safety latch. The rod 34 engages with detents in the base 12 to hold the electrode supporting apparatus in the desired position and is lifted out of such engagement by movement of the plate 29 when the gripping portion 33 is depressed.

The electrodes 21 carried on the arms 19 are connected electrically to each other by wires 35 and thus in effect constitute a single electrode spaced from the hat block, which constitutes the opposing electrode, by the thickness of the material of the hat which is to be perforated.

In Fig. 6, a modified form of electrode has been illustrated which may be used in place of the individual electrode arms 19. The apparatus shown in this figure has a modified electrode in the form of a wire screen 36. This wire screen electrode 36 is held by a curved support 37. The curved support 37 is pivotally mounted on the base 12 and has a handle 38 by means of which it may be turned to bring the free ends of screen 36 into and out of engagement with the hat 11 on the hat block 10. A number of the vertical wires 39 extending across the screen may be removed at the end of the screen to permit the individual horizontal wires 40 to flex readily in conforming with the shape of the object passing beneath them. Such an arrangement provides a flexible electrode which will readily adapt itself to and maintain contact with any irregular shape.

In the apparatus illustrated in Figure 6, the motor 15 is connected directly to the shaft 13 and the gear arrangement differs slightly from that illustrated in the other figures. In this embodiment the electrode 36 is not moved across the material being perforated so that cam 25 and its drive are not necessary.

An electrical circuit which may be used for operating the electro-perforating apparatus described herein is illustrated diagrammatically in Fig. 7. In this circuit, a transformer T is connected to a source of electrical energy S which may be the customary 120 volt alternating current. The secondary of the transformer T has a winding ratio of approximately 70:1 with the primary thereof and is connected to the electrodes 10 and 20 to supply a high tension current to said electrodes thereby causing an electric discharge to pass between said electrodes and through the material being perforated each time the voltage reaches a breakdown value during its alternations.

When the electrodes opposing the moving electrode are connected together in the manner just described, the discharge will pass between the electrodes 10 and 20 at the point where the dielectric strength of the material being perforated is lowest.

Direct current may be used if desired by connecting the apparatus in the manner illustrated and described in my copending application Serial No. 663,322, filed April 19, 1946. When such a circuit is used the series of electrodes 20 need not be connected together, and in such case the high tension current will be connected successively to each electrode of the series, so that a discharge will occur at any given time between the electrode so connected and the hat block 10.

The motor 15 which drives the hat block 10 is also connected to the source of electrical energy S. The operation of the motor 15 may be controlled by a pair of switches 41 and 42 connected in parallel in the motor circuit. The switch 41 is a push button type of switch which may be operated manually to initiate operation of the motor. When the motor is operated, a cam 43 which is driven through gearing 44, illustrated in Fig. 6, from the motor driven shaft 13 permits the micro-switch 42 to close, thus completing the motor circuit so that the motor continues to operate after the push button switch 41 is released. The gearing 44 is arranged to permit a number of revolutions of the shaft 13 before the cam 43 again opens the micro-switch 42 causing the motor to come to a halt.

While a preferred embodiment of the invention has been described and illustrated herein, it will be obvious to those skilled in the art that various changes and modifications may be made without departing from the scope of the invention as defined by the appended claims.

I claim:

1. In an apparatus for electrically perforating a hat, the combination of a series of electrodes supported in a fixed position relative to and contacting the hat at spaced points on the outer surface thereof, resilient means urging said electrodes against the outer surface of the hat, a rotatable hat block of electrically conductive material supporting the hat and contacting the inner surface of the hat in opposed relation to the series of electrodes at the respective points where the series of electrodes contact the outer surface of the hat, said hat block providing an inner electrode common to each of the electrodes of said series of electrodes in an electrical discharge circuit and means for rotating the hat block and moving the hat carried thereon relative to the series of electrodes.

2. In an apparatus for electrically perforating a hat, the combination of a series of electrodes supported in a fixed position relative to and contacting the hat at spaced points on the outer surface thereof, resilient means urging said electrodes against the outer surface of the hat, a rotatable hat block of electrically conductive material supporting the hat and contacting the inner surface of the hat in opposed relation to the series of electrodes at the respective points where the series of electrodes contact the outer surface of the hat, said hat block providing an inner electrode common to each of the electrodes of said series of electrodes in an electrical discharge circuit, means for rotating the hat block and moving the hat carried thereon relative to the series of electrodes and means for passing an electric discharge current between the hat block and the series of electrodes as the hat is being moved relative to the series of electrodes.

3. In an apparatus for electrically perforating a hat, the combination of a series of electrodes supported in a fixed position relative to and contacting the hat at spaced points on the outer surface thereof, a series of arms carrying said electrodes, a support on which said arms are resiliently hinged in spaced relation to each other, said hinging resiliently urging the electrodes carried by said arms against the outer surface of the hat and permitting movement of the respective arms and the electrodes carried thereby in response to variations in the contour of the hat, a rotatable hat block of electrically conductive material supporting the hat and contacting the inner surface of the hat in opposed relation to the series of electrodes at the respective points where said electrodes contact the outer surface of the hat, said hat block providing an inner electrode common to each of the electrodes of said series of electrodes in an electrical discharge circuit and means for rotating the hat block and moving the hat carried thereon relative to the series of electrodes.

4. In an apparatus for electrically perforating a hat, the combination as defined in claim 3 wherein the support for the arms is pivoted for moving the electrodes carried by said arms between a position where said electrodes contact and a position where said electrodes do not contact the outer surface of the hat and includes means for releasing said arms from the influence of the resilient hinging thereof when said support is pivoted to move the electrodes to the position where they do not contact the outer surface of the hat.

5. In an apparatus for electrically perforating an irregularly shaped article having a recess therein, the combination of a series of electrodes contacting the article to be perforated at spaced points on the outer surface thereof, a series of arms carrying said electrodes, a support on which said arms are resiliently hinged in spaced relation to each other with the resilient hinging of said arms urging the electrodes carried by the arms against the outer surface of the article to be perforated, said support being pivotally mounted for moving the electrodes carried by said arms into and out of contact with the outer surface of the article to be perforated, means for releasing said arms from the influence of said resilient hinging when said support is moved to a position where said electrodes are not contacting the surface of the article to be perforated, an inner electrode located within the article to be perforated and contacting with the inner surface thereof, said inner electrode being opposed to the electrodes of said series of electrodes at the respective points where said electrodes contact the outer surface of the article to be perforated and providing an electrode common to each of the electrodes of said series of electrodes in an electrical discharge circuit and means for moving the inner electrode and the article to be perforated relative to the series of electrodes.

6. In an apparatus for electrically perforating an irregularly shaped article having a recess therein such as a hat, the combination of a series of electrodes supported in a fixed position relative to the article to be perforated and contacting with the outer surface thereof at spaced points, resilient means urging said electrodes into contacting engagement with the outer surface of said article, said resilient means permitting movement of said electrodes in response to variations in the contour of the outer surface of the article while maintaining said electrodes in contact therewith, an inner electrode of electrically conductive material located within the article to be perforated, said inner electrode conforming to and contacting with the inner surface of the article to be perforated in opposing relation to the series of electrodes at the respective points where said series of electrodes contact the outer surface of the article, said inner and outer electrodes being connected in an electrical discharge circuit with the inner electrode being common to the series of outer electrodes in said circuit, and means for moving the article with the inner electrode inside thereof relative to said series of electrodes.

7. In an apparatus for electrically perforating an irregularly shaped article having a recess therein, the combination of a series of electrodes supported in a fixed position relative to and contacting with the outer surface of an article at spaced points on said surface, resilient arms supporting said electrodes and maintaining said electrodes in contact with the outer surface of said article, said resilient arms permitting movement of said electrodes in response to variations in the contour of the outer surface of the article, an inner electrode of electrically conductive material located within the recess in the article, said inner electrode contacting with the inner surface of the article in opposed relation to the series of electrodes and being movable independently of the series of electrodes, said series of electrodes and said inner electrode being connected in an electrical discharge circuit capable of creating an electric arc discharge between the series of electrodes and the inner electrode and means for moving the inner electrode and the article relative to said series of electrodes.

8. In an apparatus for electrically perforating a hat, the combination of a series of electrodes supported in a fixed position relative to and contacting the hat at spaced points on the outer surface thereof, resilient means urging said electrodes against the outer surface of the hat, a rotatable hat block of electrically conductive material supporting the hat and contacting the inner surface of the hat in opposed relation to the series of electrodes at the respective points where the series of electrodes contact the outer surface of the hat, said hat block providing an inner electrode common to each of the electrodes of said series of electrodes in an electrical discharge circuit, means for rotating the hat block and moving the hat carried thereon relative to the series of electrodes and means controlled by said rotating means for interrupting the electrical discharge circuit after a predetermined number of revolutions of the hat block.

JOHN W. MEAKER.

REFERENCES CITED

The following references are of record in the file of this patent:

UNITED STATES PATENTS

| Number | Name | Date |
| --- | --- | --- |
| 1,016,716 | Smith | Feb. 6, 1912 |
| 1,250,140 | Chapman | Dec. 18, 1917 |
| 1,783,112 | Eichenbaum | Nov. 25, 1930 |
| 1,932,057 | Wheeler | Oct. 24, 1933 |
| 2,365,576 | Meaker | Dec. 19, 1944 |
| 2,385,246 | Wilsey et al. | Sept. 18, 1945 |